(12) United States Patent
Wischinski

(10) Patent No.: US 7,313,609 B1
(45) Date of Patent: Dec. 25, 2007

(54) METHOD AND APPARATUS FOR PROGRAMMING AN AUTOMATION DEVICE

(75) Inventor: Rainer H Wischinski, Sandown, NH (US)

(73) Assignee: Schneider Automation Inc., North Andover, MA (US)

( * ) Notice: Subject to any disclaimer, the term of this patent is extended or adjusted under 35 U.S.C. 154(b) by 1006 days.

(21) Appl. No.: 09/635,280

(22) Filed: Aug. 9, 2000

(51) Int. Cl.
G06F 15/177 (2006.01)
G05B 19/18 (2006.01)

(52) U.S. Cl. ............... 709/222; 700/2; 717/171; 713/2

(58) Field of Classification Search .......... 709/208, 709/203, 220, 223, 226, 221, 222, 219; 717/174–178, 717/171; 713/2; 700/2
See application file for complete search history.

(56) References Cited

U.S. PATENT DOCUMENTS

| | | | | |
|---|---|---|---|---|
| 5,012,402 A | * | 4/1991 | Akiyama | 700/87 |
| 5,162,986 A | * | 11/1992 | Graber et al. | 700/17 |
| 5,168,441 A | * | 12/1992 | Onarheim et al. | 700/17 |
| 5,485,620 A | * | 1/1996 | Sadre et al. | 717/162 |
| 5,752,033 A | * | 5/1998 | Suda et al. | 717/109 |
| 5,805,442 A | * | 9/1998 | Crater et al. | 700/9 |
| 5,878,257 A | * | 3/1999 | Nookala et al. | 709/221 |
| 5,909,368 A | * | 6/1999 | Nixon et al. | 700/2 |
| 5,974,547 A | * | 10/1999 | Klimenko | 713/2 |
| 6,055,632 A | * | 4/2000 | Deegan et al. | 713/100 |
| 6,195,591 B1 | * | 2/2001 | Nixon et al. | 709/221 |
| 6,247,168 B1 | * | 6/2001 | Green | 717/176 |
| 6,263,487 B1 | * | 7/2001 | Stripf et al. | 717/171 |
| 6,268,853 B1 | | 7/2001 | Hoskins et al. | |
| 6,308,325 B1 | * | 10/2001 | Dobbek | 717/178 |
| 6,414,871 B1 | * | 7/2002 | Wirtz et al. | 365/185.01 |
| 6,466,972 B1 | * | 10/2002 | Paul et al. | 709/222 |
| 6,788,980 B1 | * | 9/2004 | Johnson | 718/100 |

FOREIGN PATENT DOCUMENTS

| | | | |
|---|---|---|---|
| DE | 19615190 A1 | * | 10/1997 |
| EP | 0917034 A1 | * | 5/1999 |
| EP | 0982644 A1 | | 3/2000 |
| FR | 2785122 | | 4/2000 |

(Continued)

OTHER PUBLICATIONS

Ditze, Carsten. "A Customizable Library to support Software Synthesis for Embedded Applications and Micro-Kernel Systems", Sep. 1998, Proceedings of the 8th ACM SIGOPS European Workshop on Support for composing distributed applications, pp. 88-95.*

(Continued)

*Primary Examiner*—Saleh Najjar
*Assistant Examiner*—David Lazaro

(57) ABSTRACT

A method and apparatus for a control system of an automation network. The control system comprises an automation device operably connected to the network. Also operably connected to the control system is a network device for storing an application program for controlling the automation device. A message request for the application program is transmitted from the automation device to the network device. A customized application program is selected in response to the message request and transmitted to the automation device. The application program is installed in the automation device and executed.

21 Claims, 4 Drawing Sheets

FOREIGN PATENT DOCUMENTS

| | | | |
|---|---|---|---|
| FR | 2785122 A1 | * | 4/2000 |
| JP | 09245705 | | 3/1999 |
| WO | WO 01/14963 A1 | | 3/2001 |

OTHER PUBLICATIONS

"Java and Programmable Automation Controllers," CiMax: Edition Terrain, No. 13—May-Jun. 1997, copy in French, Certificate of Accuracy of translation from Merrill Coproration, dated May 19, 2004 and translated copy.

Communication from the European Patent Office dated Aug. 11, 2001, submitting the international search report for International Publication No. WO 01/69335 A3: PCT/US01/05564.

Quinnell, R.A., "Web Servers in Embedded Systems Enhance User Interaction," *EDN Electrical Design News*, Apr. 10, 1997, pp. 61-64, 66, 68.

Kubota, Y, et al., NTT Human Interface Laboraories, "Proposal of the Robot System With Information Sending Mechanism," Presented at the 14th Annual Conference of the Robotics Society of Japan, Nov. 1-3, 1996, pp. 341-342. (In Japanese w/ English translation included).

Brugger, Peter, "Web Technology in Embedded Computing," *Industrial Computer 97—Special Edition*; Sep. 3, 1997 (in German w/ English translation included).

Williams, Tom, et al., "Java Goes to Work Controlling Networked Embedded Systems," *Computer Design*, Aug. 1996, pp. 36.

Fu, K.S., et al., *Robotics: Control, Sensing, Vision and Intelligence*, Chapter Five: Control of Robot Manipulators; Sections 5.1-5.3.1, 1987.

*Automation Strategies*, by Automation Research Corporation, Feb. 1998, pp. 1-32.

* cited by examiner

METHOD AND APPARATUS FOR PROGRAMMING AN AUTOMATION DEVICE

TECHNICAL FIELD

The present invention relates to a control system. More specifically, the present invention relates to a control system on a network having an automation device wherein the operating program for controlling the automation device is to selected from a network device in response to the automation device.

BACKGROUND OF THE INVENTION

An automation network includes several nodes, i.e., network devices, connected on a network and controlled from one or more locations. Often times, network designers prefer to use similar, interchangeable devices on a network. Depending on the application of an individual, "standardized," network device, certain functions of the device may not be used.

An automation device such as a programmable logic controller (PLC) generally comprises a computer processing unit, RAM, Flash RAM and a network interface. The application program for controlling the PLC is stored in the Flash RAM, typically consuming 256-512K of Flash RAM. The application code is transmitted to RAM at boot up of the automation device. Depending on the desired funtionality of the automation device, various portions of the application code may not be used. For instance, an all-purpose or "universal" application program can implemented wherein a standard executive code and user code for the control system exists within the application program for any desired network function. Due to the universality of the application code, the application code can be quite large. Some of the PLCs integrated with the network will not utilize all of the functionality provided within the standardized application program. Transferring and executing a large application program will affect the overall efficiency of the control system. The unnecessary use of storage space on the system, along with the additional time involved in transferring larger program codes, contributes to the inefficiency of the control system.

The present invention is provided to solve these and other problems.

SUMMARY OF THE INVENTION

The present invention is directed to a control system comprising an automation device operably connected to a network. A network device is operably connected to the network and comprises an at least one predetermined application program for controlling the automation device. The application program is selected in response to a message requesting the application program that is sent by automation device. The application program includes an executive code and user code. Alternatively, the application program can be dynamic wherein the executive and user codes are selected in response to the message requesting the application program and/or the selected executive and user codes.

Another embodiment of the present invention is directed to a method of operating a control system on a network. An application program is stored on a network device operably connected to the network. A message requesting the application program is originated by the automation device. An application program is selected in response to the message requesting the application program. The selected application program is transmitted and installed on the automation device. Alternatively, the program application comprises an executive and a user code. The user code is selected in response to the message requesting the application code. The executive code is selected in response to the selected user code. The selected user and executive codes are transmitted to the automation device for execution.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION OF THE PREFERRED EMBODIMENT

Figure 1:
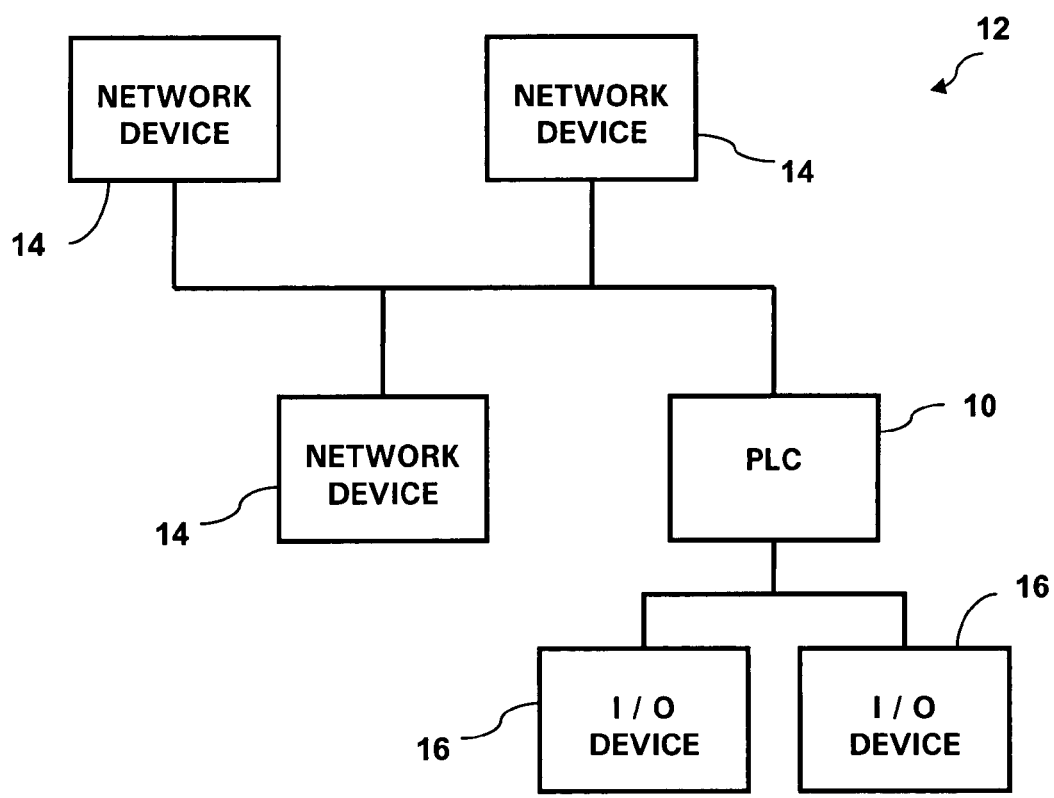
FIG. 1 is an illustration of a block diagram representing the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

A control system shown in FIG. 1 includes an automation device 10 operably connected to a network 12. The automation device 10, preferably a programmable logic controller (PLC), can be operably connected to other PLCs 10 or input/output (IO) devices 16. The PLC 10 controls and monitors the IO devices 16. Depending on the desired application of PLC 10, the PLC can comprise different hardware and software code.

Other network devices 14, i.e., network personal computer, computer, input/output (IO) module 16, printer, etc., can also be operably connected to the network 12. A network device 14, preferably a server, stores one or more predetermined application programs 20 for use with the automation device 10. The application program 20 is selected in response to a message sent by the automation device 10 requesting the application program. Storing an array of application programs 20 within the network device 14 eliminates the need for the automation device 10 to store its own application programs.

An application program 20 comprises an executive code and a user code for the PLC 10, along with a boot up code.

The application program 20 can be stored, created and edited using the network device 14 without requiring the resources of the PLC 10. In addition, a standard or universal application program 20 can be "customized" for a particular function or automation device 10. Thus, depending on the application program 20 required by the automation device 10, the network device 14 can provide the automation device 10 with an application program code that is specifically directed to the desired fimctionality. The request is generated by the PLC 10 incorporating a dynamic host configuration (DHCP) or bootstrap (BOOTP) protocol.

Further customization of the application program 20 includes tailoring the executive program of the application program to meet the minimum criteria to effectively execute the application program 20. For example, a single, common, generic application program can reside in the server 14. Subject to the message request sent by the PLC 10 requesting the application program, unutilized sections of the code can be eliminated and parsed out from the generic application program prior to transmitting the selected application program to the PLC. In response to the message request for the application program, the server 14 selects a user code and an executive code. The user code can be selected in response to the message request for the application program. The executive program code can be selected in response to the user code selected and/or the message requesting the application program. Alternatively, several specific, predetermined application codes capable of interacting with any PLC 10 on the network can reside on the network device 14.

The "customized" executive and application program 20 codes improve the efficiency of the network 12 by decreasing the need for storage space on the automation device 10 and allowing for faster transfers of the application program 20 throughout the network 12. In addition, the need for Flash RAM on the automation device 10 to store the application program is significantly reduced. The PLC's Flash RAM will contain the minimum amount of code for downloading the executive and user codes from the network device 14. The application program code 20 for the PLC 10 is stored in the network device 14 and downloaded to the automation device 10 at boot time.

Although the preferred network 12 implementation is Ethernet, other network implementations can also be used such as Internet, Profibus, ControlNet and Modbus+. An application program 20 for controlling an automation device 10 is stored on a network device 14 operably connected to the network 12. The PLC 10 sends out a BOOTP or DHCP request for obtaining an address on the network 12. A message request from the PLC 10 is transmitted to the network device 14, preferably a server, for acquiring the application program 20. The applicable application program 20 is selected and transmitted from the network device 14 to the PLC 10 in response to the message request for the application program. The application program 20 is then installed and executed on the PLC 10.

Figure 2:
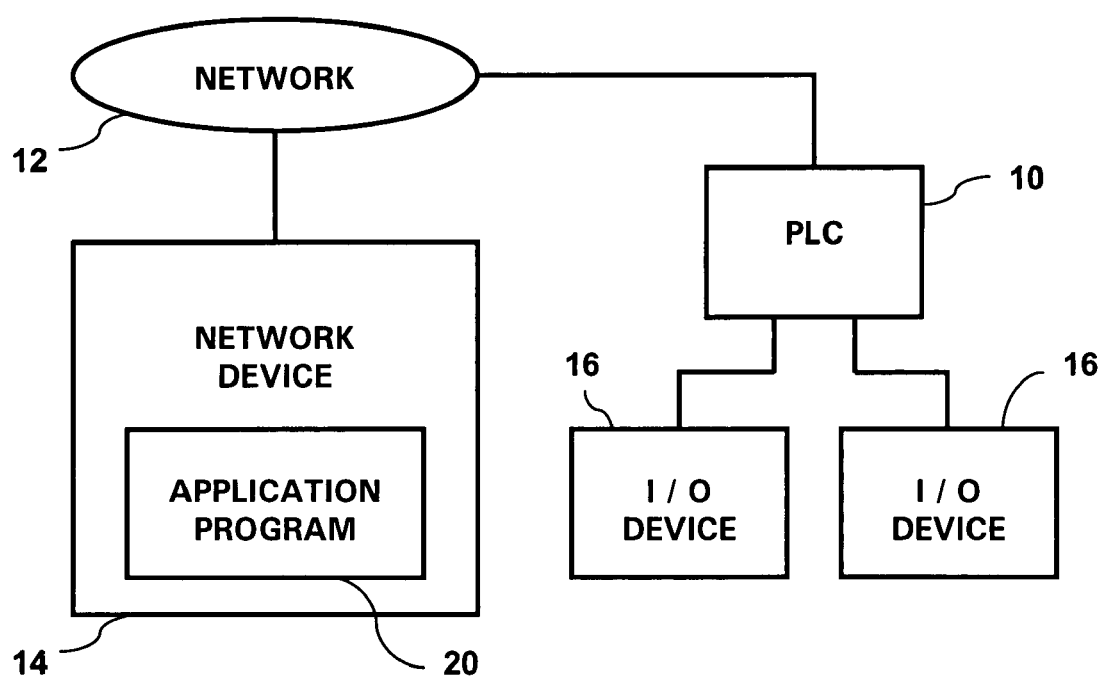
FIG. 2 shows a block diagram of the present invention illustrating the relationship between an automation device and a network device for storing an application program to be executed on the automation device.
Figure 3:
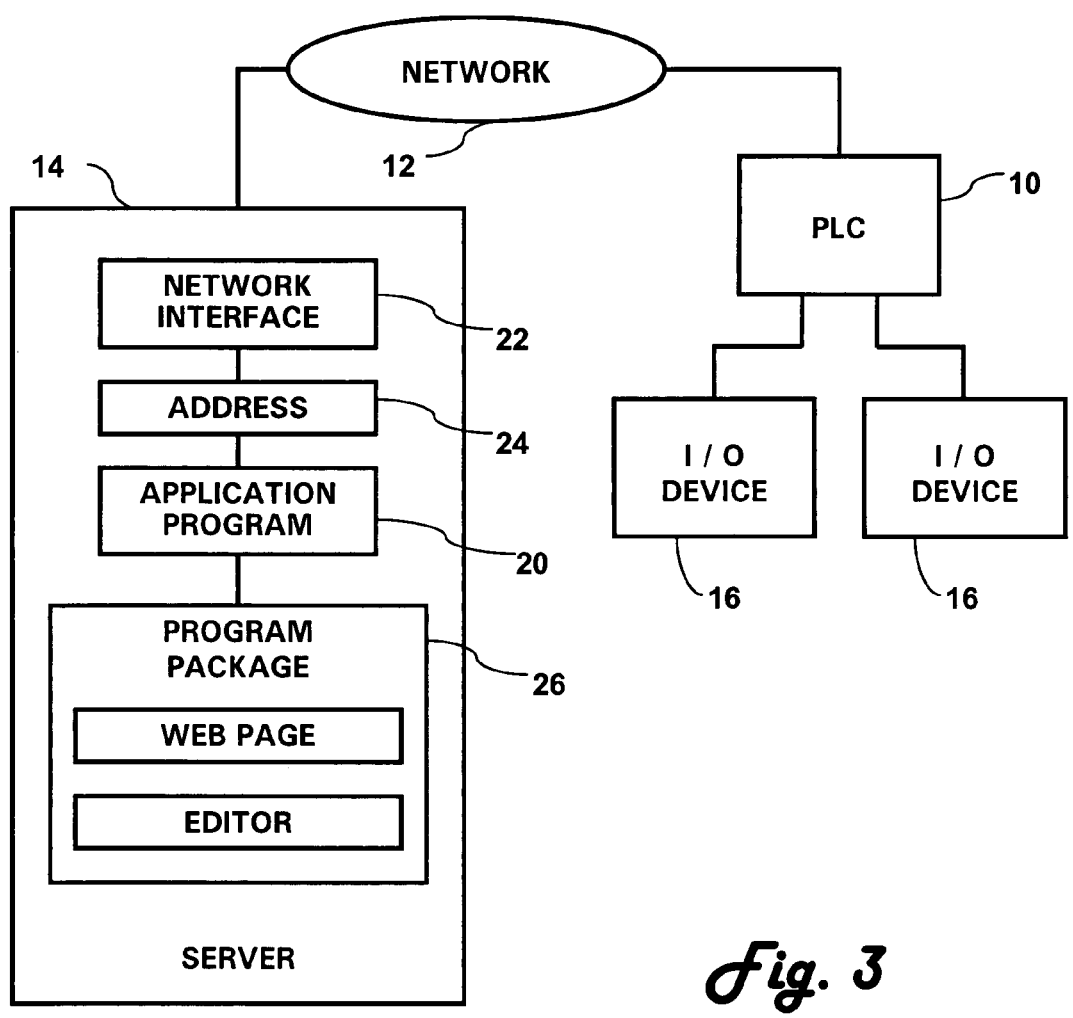
FIG. 3 shows a block diagram of another embodiment of the present invention; and, FIG. 4 shows a block diagram of another embodiment of the present invention.
Figure 4:
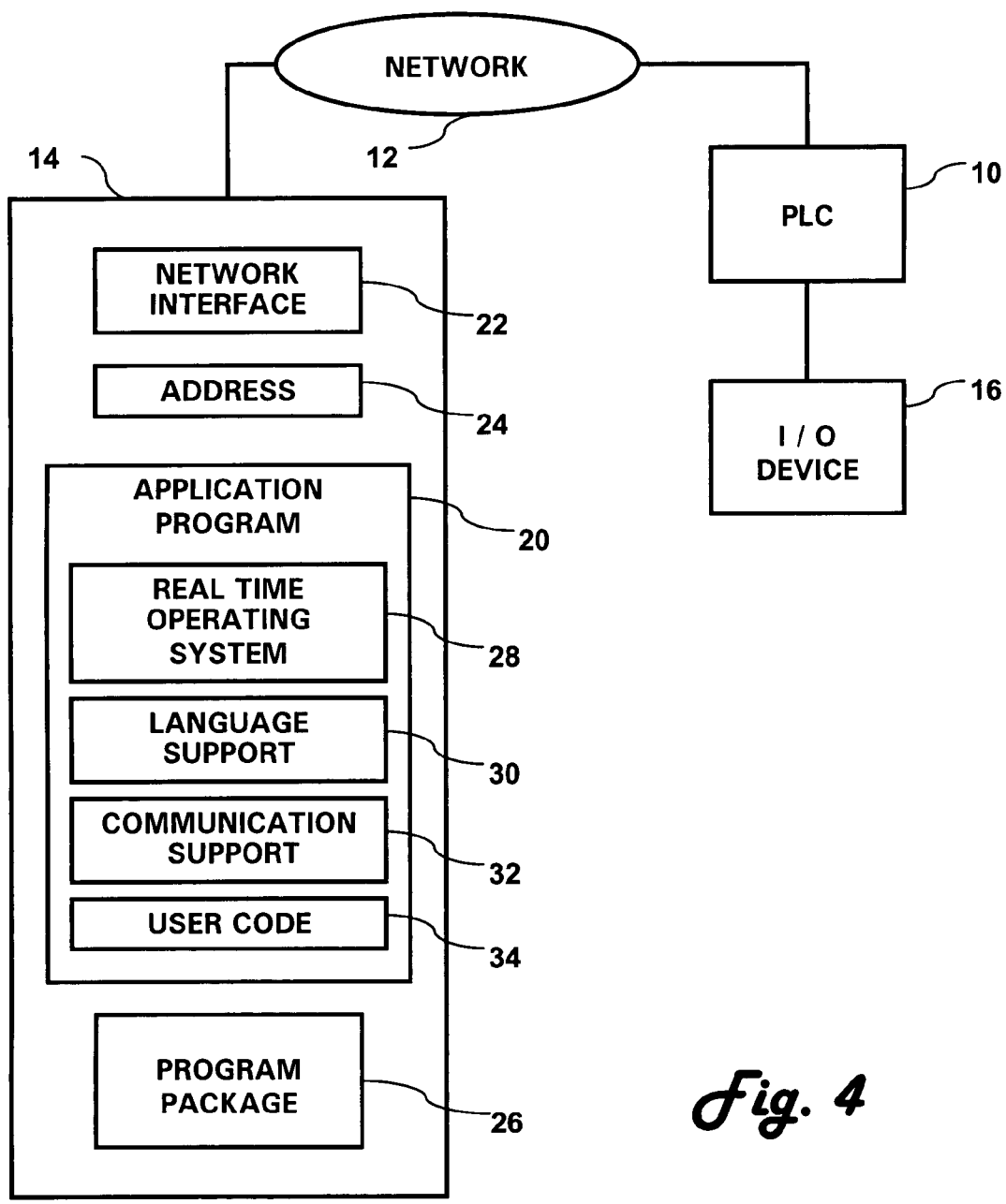

FIGS. 2-4 show block diagrams of the present invention illustrating the relationship between an automation device 10 and a network device 14, i.e., server, for storing an application program 20 to be executed on the automation device 10. The server 14 includes a network interface 22 having an unique network address 24 and an application program 20. The server 14 acts as a hypertext transfer protocol (HTTP) interpreter which uses a network protocol, i.e., Transmission Control Protocol/Internet Protocol (TCP/IP) stack to interact with the network interface 22 and the application program 20. This enables the transfer of the application program 20 to the PLC 10 through the network 12.

The application program 20 provides an operating program, i.e., executive and user codes; to the PLC 10. The executive code comprises a real time operating system 28, language support 30 and communication support 32. The user code 34 includes ladder logic or IEC 1131 code. The PLC 10 operating program can be stored, created or edited remotely from the PLC 10 and then transmitted to the PLC for use in the control system when desired. The TCP/IP stack enables data transfers over the network as by the IP protocol. The server 14 includes a program package 26 for editing and creating application programs 20. A user can access the program package 26 via a web page. The web page will display a home page which may contain text, some type of multimedia offerings such as graphic images, video, or audio, and hypertext links to other documents. A user using a browser can view the application program 20 via the web page and edit or create application programs 20 for use on the control system. The browser functions as a remote human-machine interface (HMI) with the network device 14 and the PLC's operating program 20.

It is understood by those skilled in the art that numerous changes and deviations in the form and detail thereof may be made without departing from the spirit and scope of the present invention. For example, the control system can incorporate a wireless network, or a network with a plurality of gateways and bridges. Similarly, the network device can be modified to include more components or to reduce the number of components. However, these variations do not depart from the scope of the present invention wherein network addressing is based, partly or completely, on the physical site location of the devices in the network.

Thus, the present invention has been described with respect to the preferred embodiments thereof. While specific embodiments have been illustrated and described, numerous modifications come to mind without significantly departing from the spirit of the invention and the scope of protection is only limited by the scope of the accompanying claims.

I claim:

1. A control system, comprising:
   an automation device operably connected to a network;
   a network device operably connected to the network; and,
   a plurality of customized application programs for the automation device stored in the network device, wherein one customized application program of the plurality of customized application programs controls the automation device, and is selected by the network device in response to a specific application program request message for the one customized application program received at the network device and sent from the automation device as part of a bootstrap protocol, and wherein the customized application program is downloaded to the automation device at a boot time of the automation device.

2. The control system of claim 1 wherein the one customized application program comprises an executive code and a user code.

3. The control system of claim 2 wherein the executive code is selected in response to the user code selected.

4. The control system of claim 1 wherein the automation device is a programmable logic controller.

5. The control system of claim 1 wherein the network device is a server.

6. The control system of claim 5 wherein the server has a TCP/IP protocol stack.

7. The control system of claim 1 wherein the network is Internet.

8. The control system of claim 1 wherein the network is Ethernet.

9. The control system of claim 1 wherein the network is Profibus.

10. The control system of claim 1 wherein the network is ControlNet.

11. The control system of claim 1 wherein the network is Modbus+.

12. A method of operating a control system on a network comprising the steps of:
- providing a network device for storing a plurality of customized application programs to be executed on an automation device;
- transmitting a message for requesting a network address for the automation device by the automation device;
- transmitting a message by the automation device for requesting one customized application program of the plurality of customized application programs for the automation device as part of a bootstrap protocol;
- selecting the one customized application program in response to the message for requesting one customized application program of the plurality of customized application programs;
- transmitting the one customized application program to the automation device; and,
- installing the one customized application program on the automation device at a boot time of the automation device.

13. The method of claim 12 further comprising the step of executing the customized one application program on the automation device.

14. The method of claim 12 wherein the step of selecting the one customized application program in response to the request for one customized application program of the plurality of customized application programs comprises the steps of:
- identifying the message for requesting one customized application program of the plurality of customized application programs;
- selecting a user application program in response to the message requesting one customized application program of the plurality of customized application programs; and,
- selecting an executive program in response to the user application program selected.

15. The method of claim 12, wherein the specific customized application program further comprises:
- an executive program code for the automation device; and,
- a user program code for the automation device, the user program is selected in response to the message requesting one customized application program of the plurality of customized application programs.

16. The method of claim 15 wherein the executive program code is customized in response to the message to meet the minimum requirements for executing the one customized application program.

17. A network control system, comprising:
- means for operably connecting a network device to the network control system, the network device stores a plurality of customized application programs for controlling an automation device;
- means for transmitting a message requesting a network address by the automation device;
- means for transmitting a message by the automation device requesting one customized application program of the plurality of customized application programs as part of a bootstrap protocol;
- means for selecting the one customized application program in response to the message requesting the one customized application program;
- means for transmitting the one customized application program to the automation device; and,
- means for installing the one customized application program at a boot time of the automation device.

18. The network control system of claim 17 wherein the automation device is a controller.

19. The network control system of claim 17 wherein the network device is a server.

20. A method of operating a control system on a network comprising the steps of:
- providing a network device for storing a plurality of customized application programs to be executed on an automation device;
- requesting a network address for the automation device by the automation device;
- requesting one customized application program of the plurality of customized application programs by the automation device as part of a bootstrap protocol;
- selecting the one customized application program;
- transmitting the one customized application program to the automation device; and,
- installing the one customized application program on the automation device at a boot time of the automation device.

21. The method of claim 20 wherein further comprises:
- selecting a user code for the one customized application program; and,
- selecting an executive code for the one customized application program.

* * * * *